United States Patent [19]
Dinkelacker et al.

[11] Patent Number: 5,452,209
[45] Date of Patent: Sep. 19, 1995

[54] METHOD AND SYSTEM FOR REGULATION AND/OR CONTROL OF AN AUTOMOBILE CHASSIS

[75] Inventors: Michael Dinkelacker, Stuttgart; Rainer Heinsohn, Tamm; Peter Meissner, Kornwestheim; Klaus Landesfeind, Fellbach; Eberhardt Schunck, Kornwestheim, all of Germany

[73] Assignee: Robert Bosch GmbH, Stuttgart, Germany

[21] Appl. No.: 154,942

[22] Filed: Nov. 19, 1993

[30] Foreign Application Priority Data

Dec. 18, 1992 [DE] Germany .................. 42 42 912.9

[51] Int. Cl.$^6$ .................................. B60G 17/015
[52] U.S. Cl. ........................ 364/424.05; 280/707
[58] Field of Search ............... 188/299; 267/136; 280/707; 364/424.05

[56] References Cited

U.S. PATENT DOCUMENTS

| | | | |
|---|---|---|---|
| 5,020,781 | 6/1991 | Huang | 267/136 |
| 5,248,015 | 9/1993 | Yoshioka et al. | 188/299 |
| 5,269,557 | 12/1993 | Butsuen et al. | 280/707 |
| 5,276,623 | 1/1994 | Wolfe | 364/424.05 |
| 5,295,705 | 3/1994 | Butsuen et al. | 280/707 |
| 5,303,155 | 4/1994 | Kallenbach et al. | 364/424.05 |
| 5,313,390 | 5/1994 | Schramm et al. | 364/424.05 |
| 5,324,067 | 6/1994 | Kallenbach et al. | 280/707 |
| 5,346,242 | 9/1994 | Karnopp | 280/707 |

FOREIGN PATENT DOCUMENTS

| | | |
|---|---|---|
| 0222329 | 5/1987 | European Pat. Off. . |
| 0311114 | 4/1989 | European Pat. Off. . |
| 0382480 | 8/1990 | European Pat. Off. . |
| 0484697 | 5/1992 | European Pat. Off. . |
| 4008617 | 1/1992 | Japan . |
| 4169316 | 6/1992 | Japan . |
| 4173414 | 6/1992 | Japan . |
| 4325304 | 11/1992 | Japan . |
| 92/20541 | 11/1992 | WIPO . |

OTHER PUBLICATIONS

Vibration Control Using Semi-Active Force Generators, D. Karnopp et al., Journal of Enigneering for Industry, May 1974, p. 619.

*Primary Examiner*—Kevin J. Teska
*Assistant Examiner*—Russell W. Frejd
*Attorney, Agent, or Firm*—Baker & Daniels

[57] ABSTRACT

The invention is based on a method and system for regulation and/or control of an automobile chassis where between the vehicle body and at least one wheel there is at least one actuator actuated by actuation signals for exertion of forces between the vehicle and the at least one wheel. At least parts of the actuation signals are so formed that the vertical movements of the vehicle body will be damped inertially. According to the invention, at least parts of the actuation signals (Fij) are so formed that the damping takes place dependent on the magnitude of the vertical velocity (Zaij') of the vehicle body.

11 Claims, 2 Drawing Sheets

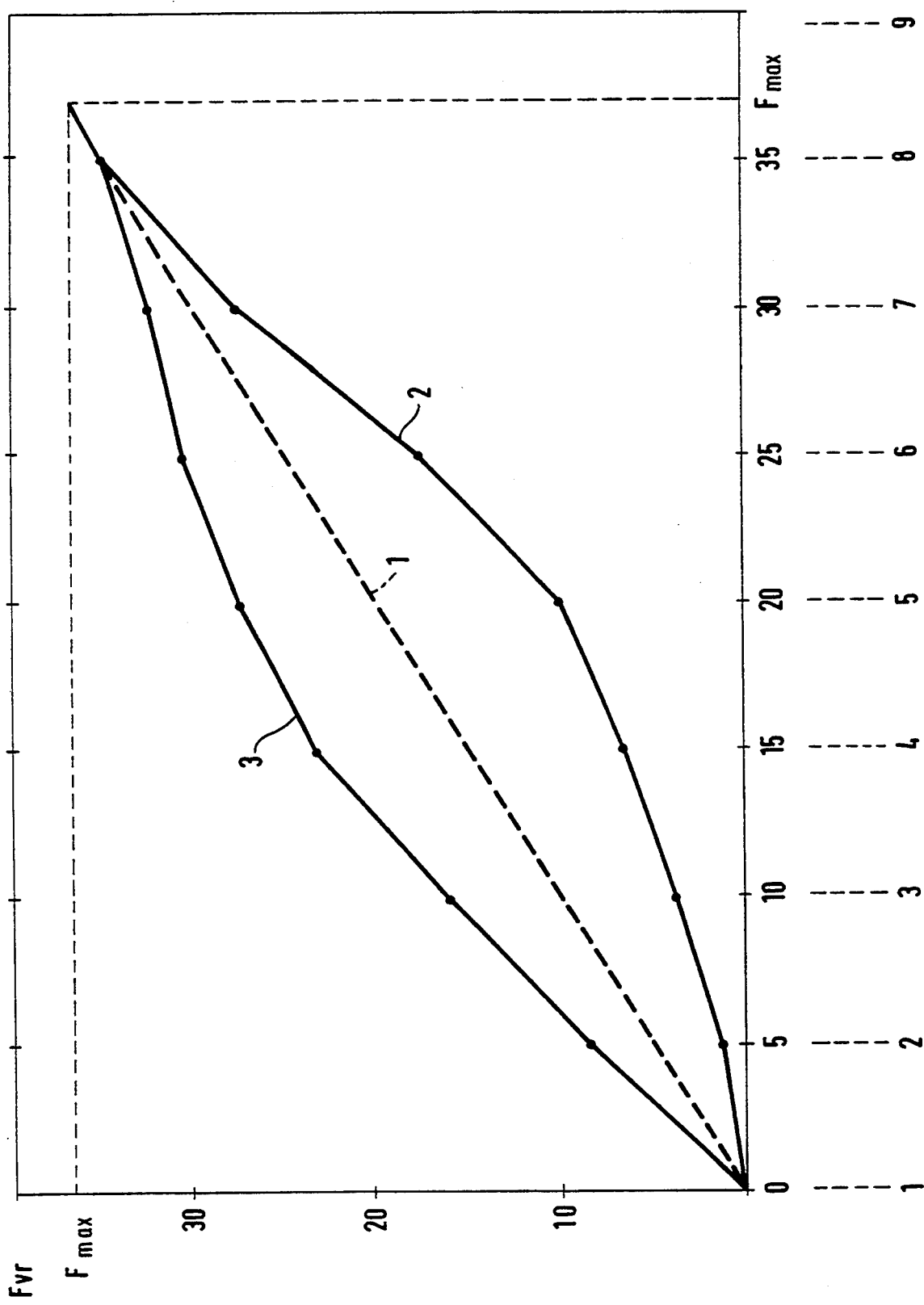

METHOD AND SYSTEM FOR REGULATION AND/OR CONTROL OF AN AUTOMOBILE CHASSIS

BACKGROUND OF THE INVENTION

1. Field of the Invention

The invention concerns a process and device for regulation and/or control of an automobile chassis.

2. Description of the Related Art

To improve the travel comfort and road safety of passenger cars and trucks, an active chassis may be utilized instead of a passive chassis. With such active chassis, the characteristic of the suspension systems between the vehicle body and wheels can be influenced, depending on the state of travel, in the sense of a control or regulation. Most varied pertinent control or regulation concepts are known from the prior art.

As such a control or regulating concept, the so-called "skyhook" concept is known from the prior art (e.g., Vibration Control Using Semi-Active Force Generators, D. Karnopp et al., Journal of Engineering for Industry, May 1974, p. 619). Based upon the skyhook concept is the ideal notion of damping vehicle body movements relative to an inertial reference plane. For realization of this ideal notion it is proposed to utilize the sensed inertial velocities of the vehicle body for adjustment of actuators which apply forces between the vehicle body and the wheels. Specifically, the actuators are activated for exertion of forces between the vehicle body and the wheels, in such a way that these forces are proportional to the sensed inertial body velocities. An inertial damping of the vehicle body movements is arrived at thereby. With fully active systems, the actuators can exert forces between the vehicle body and the wheels, irrespective of the relative movement. Additionally, as so-called semiactive actuators, dampers are used which are adjustable in their damping properties.

A particular advantage of this described damping of body movements is constituted by the fact that a remarkable increase of the travel comfort is achieved thereby, while at the same time the road safety is at least not impaired.

The problem underlying the present invention is, basing on the described skyhook control notion, to obtain improvements in the application of this control concept.

SUMMARY OF THE INVENTION

The invention is based on a method and system for regulation and/or control of an automobile chassis where for exertion of forces at least one actuator is arranged between the vehicle body and at least one wheel. This actuator is for exertion of forces actuated by actuation signals in such a way that at least parts of these actuation signals will be formed in such a way that the vertical movements of the vehicle body will be damped inertially. This corresponds to the aforementioned skyhook control notion known from the prior art. The core of the invention now is that at least parts of the actuation signals are formed in such a way that the inertial damping known from the prior art depends on the magnitude of the vertical velocity of the vehicle body. As initially described, the inertial damping of the vertical body movements is known from the prior art, that is, that the actuator is actuated for exertion of forces Fd which are proportional to the inertial body velocities Za'. Here, the forces Fd to be applied are thus linked to the inertial body velocities Za' by a constant proportionality factor d=const (damping constant)

$$Fd = d*Za'.$$

In contrast, the inertial damping according to the invention depends on the magnitude of the vertical velocity Za' of the vehicle body. That is, the proportionality factor d is a function of and depends on the vertical velocity Za'

$$Fd = d(Za')*Za'.$$

In one possible embodiment of the invention, this makes it possible to adjust in the presence of lower vertical velocities of the vehicle body a damping that is less than in the presence of higher vehicle body velocities. This embodiment of the invention is advantageous particularly when as actuators there are dampers actuated which are adjustable in their damping properties. The adjustment of such dampers may be accompanied by jolts or switching noises attributable to the fact that the adjustment of the damping characteristic does not occur exactly at the damper piston reversal point (relative velocity between vehicle body and wheel=0). The reason for this may be system run times. Switchings outside the velocity zero point of the damper may engender pressure peaks which make themselves felt by switching noises or noticeable jolts. When now, according to this embodiment of the invention, adjusting the damping at slight, i.e., low body velocities lower, the result, for the above reasons, is a reduction of the properties which subjectively are felt as unpleasant (jolts, noises), since the damper does not switch at every change between traction and thrust stage of the damper, but switches only relatively seldom, when the body velocity exceeds a certain measure.

Another embodiment of the invention provides for adjusting the damping in the presence of lesser vertical velocities of the vehicle body higher than in the presence of higher velocities. Underlying this embodiment of the invention is the insight that a high inertial damping of the body is at very small body movements achievable only with very high skyhook amplification factors (high proportionality factor between actuator force and inertial body velocity). But if these skyhook amplification factors, high for damping of small body movements, now were used also for damping stronger body movements, these stronger body movements would be damped too abruptly, which is felt as unpleasant. This conflict is inventionally solved in that a "degressive skyhook force" is applied where the ratio between actuator force and body velocity diminishes at increasing body velocity.

Further developments of the invention enable also further deviations from the linear skyhook function known from the prior art where, as described above, a fixed proportionality factor determines the ratio between body velocity and actuator force. Thus, a favorable embodiment of the invention may be constituted by selecting at very low body velocities a progressive characteristic, at low body velocities a linear, a degressive one in the medium, and a negatively linear one in the high body velocity range. Any other dependencies are possible, for instance depending on the applicable vehicle.

A further favorable embodiment bases on first signals which, as known from the prior art, are proportional to the inertially sensed vertical velocity of the vehicle body. Inventionally, these first signals are now weighted for generation of the actuation signals of the actuators depending on the magnitude of the vertical velocity of the vehicle body. With this embodiment, described in detail, the aforementioned inventional, velocity-dependent inertial damping of the vehicle body is arrived at.

Inventional provisions are that for at least three values of the inertial body velocity a nonlinear correlation between the values for the body velocity and the values of the force exist between actuation signals representing the vehicle body and the wheel. As opposed to it, a linear correlation exists with the skyhook control system known from the prior art between the above values, if the actuation signals are directly proportional to the applied forces of the actuator (force adjuster).

Provisions in another embodiment are that the above weighting, in the presence of lower vertical velocities of the vehicle body, be effected at a scale lesser than in the presence of higher vehicle velocities. Obtained thereby is the aforementioned reduced inertial damping for small body movements. Furthermore, stipulations for this embodiment may also be that the weighting, in the presence of greater velocities of the vehicle body, be performed at a scale lesser than in the presence of lower velocities of the vehicle body.

The weightings concerning the velocities of the vehicle body may be carried out continuously or in discrete steps. Thus, it may be stipulated that the inventional dependence between the first signals that are proportional to the inertial vertical velocity of the vehicle and the actuation signals which are weighted depending on the magnitude of the vertical velocity of the vehicle body be stored in the form of a characteristic curve.

Particularly favorable is the use of the inventional procedure if as actuators there are dampers activated which are adjustable in their damping property. These dampers, as described above, may at switchings outside the velocity zero passage involve the jolts and noises felt as unpleasant. For adjustable dampers, an inventional proviso may be that the damping or the weighting be carried out depending on whether the damper is in its traction or thrust stage.

Moreover, the weightings, or body velocity-dependent inertial dampings, may be effected variably for the individual actuators.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 2 is a graph of the transfer performance of second means 12.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
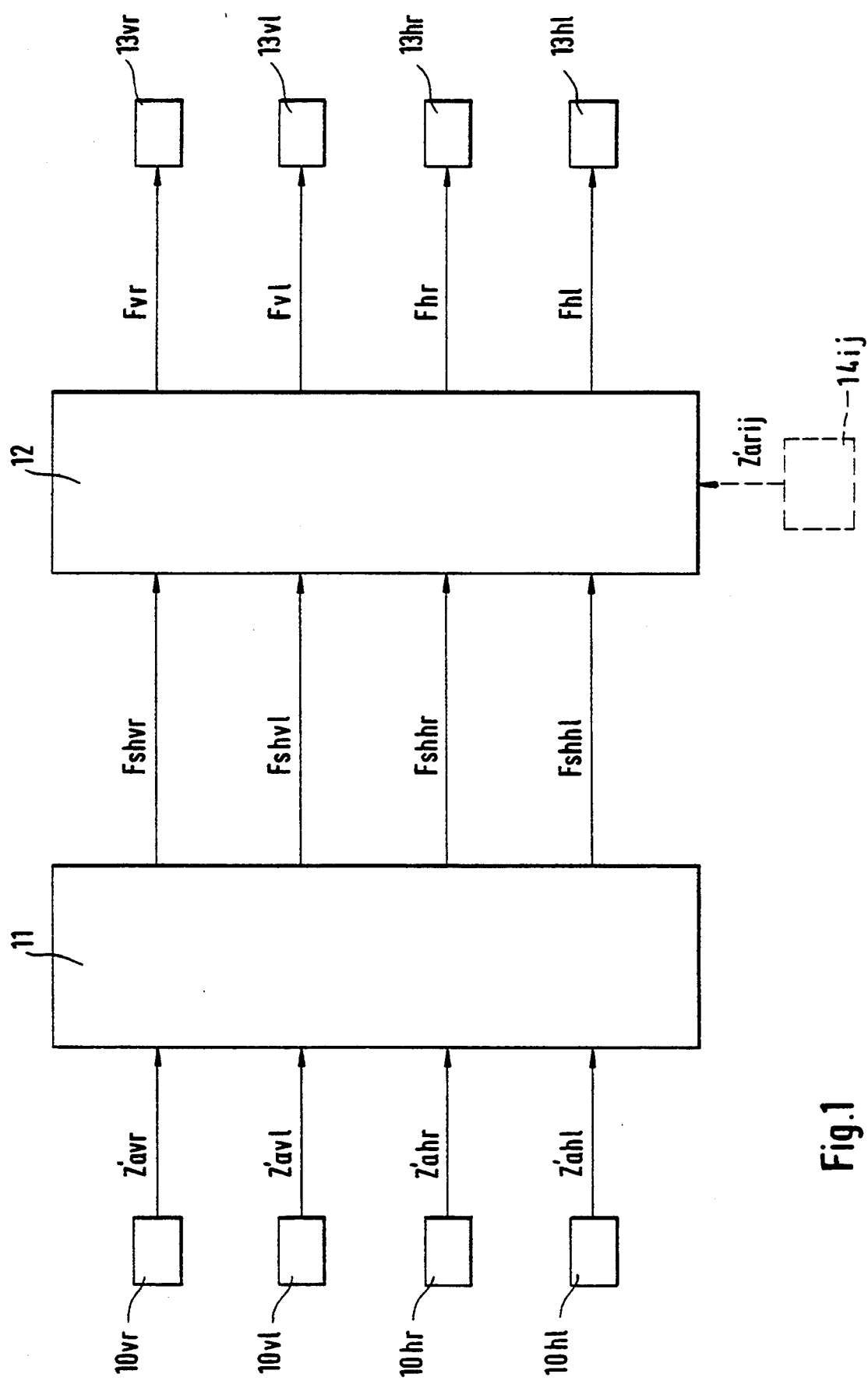
FIG. 1 is an example of an embodiment of a system according to the present invention.

In the following, the invention shall be described with the aid of the drawings, references shown in the figures being provided with indices representing the coordination of the signals, or systems, with the actuators. Index i shows that the indexed variable pertains to the front (i=v) or to the rear (i=h) vehicle half. Index j indicates that the indexed variable belongs to the right-hand (j=r) or to the left-hand (j=l) vehicle half. Thus, the actuators are referenced, e.g., $13ij$, where the actuator $13vr$ is the one located in the front, right-hand vehicle area.

In FIG. 1, reference $10ij$ marks means which directly or indirectly determine the inertial velocities $Zaij'$ of the vehicle body. Referenced 11 are first means which in the way known from the prior art form the signals $Fshij$. These signals $Fshij$ are transmitted to the second means 12, which according to the invention form the actuation signals $Fij$ for the actuators $13ij$. Optionally, signals $Zaij'$ of the means $14ij$ may be transmitted to the second means 12, which signals represent the relative movements between the vehicle body and wheels.

FIG. 1 shows the dependence of the actuation signals $Fij$ on the signals $Fshij$ depicted in FIG. 1 with the aid of the front, right-hand actuator.

Sensed by the means $10ij$ are vertical body velocities $Zaij'$. This sensing of the body velocities may be carried out, e.g., by inertially measuring acceleration sensors, the acceleration signals being integrated to the desired velocity signals. But the body velocity signals may also be determined indirectly from the relative movements between the vehicle body and the wheels, where the vehicle parameters must be allowed for.

Formed in the first means 11 are then signals which are proportional to the sensed body velocities. Present on the output of the first means 11 are thus signals representing the forces which correspond to the skyhook forces known from the prior art.

Weighted by the second means 12 are the skyhook forces, or the signals $Fshij$ representing the skyhook forces, depending on the body velocities, i.e., depending on the signals $Fshij$ themselves. Present on the outputs of the second means 12 are then the actuation signals $Fij$ for the actuators $13ij$ so weighted, which actuators are in this embodiment configured as dampers which are adjustable in their damping properties.

FIG. 2 illustrates in exemplary fashion the transfer performance of the second means 12. The linear progression (line 1) represents the actuation signals formed according to the prior art. Here, the actuation signals $Fij$ equal the conventionally formed skyhook forces $Fshij$ (linear progression of line 1). Line 2 shows a degressive course for small body velocities and a progressive course for greater body velocities. Here, smaller body velocities are inventionally damped less than greater body velocities. This offers the previously mentioned advantages regarding the switching noises or jolts.

Line 3 illustrates a progressive course for smaller body velocities and a digressive course for greater body velocities. In this embodiment, also smaller body velocities are subjected to a higher inertial damping. The characteristic curves 2 and 3 illustrated in the second means 12, or in FIG. 2, are in this embodiment linear between the individual bearing points 1 through 8. Made available are then n=8 bearing points between the minimal and maximal force level. Interpolations are effected between these bearing points.

The characteristic curve may be preset differently for the thrust and traction stages of the dampers 13$ij$. Furthermore, the characteristic curve for each wheel, or each damper, may be adjusted individually.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. In a vehicle, a method for one of regulation and control of a vehicle chassis, wherein the vehicle includes a body, a wheel, and an actuator associated with said wheel for application of forces between the wheel and the body, said method comprising the steps of:
generating an actuation signal, said actuation signal dependent on the amplitude of an absolute vertical velocity of a point on the body and on a proportionality factor which is dependent on said amplitude of said absolute vertical velocity of said point on the body;
transmitting said actuation signal to said actuator and actuating said actuator; and
damping vertical inertial movements of the body utilizing said actuator.

2. The method of claim 1, wherein said generating step comprises generating said actuation signal utilizing a degressive transfer function for an absolute vertical velocity of lesser amplitude, and utilizing a progressive transfer function for an absolute vertical velocity of greater amplitude.

3. The method of claim 1, wherein said generating step comprises generating said actuation signal utilizing a progressive transfer function for an absolute vertical velocity of lesser amplitude, and utilizing a degressive transfer function for an absolute vertical velocity of greater amplitude.

4. The method of claim 1, wherein said proportionality factor is based on a non-linear relationship between said amplitude and a value of said actuation signal.

5. The method of claim 4, wherein said non-linear relationship between said amplitude and said actuation signal value exists for at least three values of said amplitude.

6. The method of claim 1, wherein the said actuator comprises an adjustable damper.

7. The method of claim 6, wherein said actuation step is carried out dependent on whether said damper is in a traction stage or compression stage.

8. The method of claim 1 including a plurality of wheels and a plurality of actuators respectively associated with said wheels, said generator generating actuation signals for each said actuator dependent on the amplitudes of the absolute vertical velocities of a plurality of points on the body and proportionality factors dependent on the amplitudes of the absolute vertical velocities of said plurality of points on said body.

9. The method of claim 8 wherein said proportionality factor is different for at least two of said actuators.

10. The method according to claim 8 wherein said proportionality factors are based on discrete values of said amplitudes.

11. In a vehicle, a system for one of regulation and control of a vehicle chassis, wherein the vehicle includes a body and a plurality of wheels, said system comprising means for generating a plurality of actuation signals; and a plurality of actuators respectively associated with each of said wheels and respectively responsive to said actuation signals for application of forces between each wheel and the body and thereby damping vertical inertial movements of the body, said actuation signals each respectively dependent on the amplitude of an absolute vertical velocity of a point on the body and on a proportionality factor which is dependent on the amplitude of the absolute vertical velocity of the said point on the body.

* * * * *